(12) United States Patent
Krishnan et al.

(10) Patent No.: US 7,190,836 B2
(45) Date of Patent: Mar. 13, 2007

(54) EFFICIENT ORDERING OF DATA FOR COMPRESSION AND VISUALIZATION

(75) Inventors: Arun Krishnan, Exton, PA (US); Michael Wesley Marcellin, Tucson, AZ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 73 days.

(21) Appl. No.: 10/100,154

(22) Filed: Mar. 18, 2002

(65) Prior Publication Data

US 2003/0174883 A1 Sep. 18, 2003

(51) Int. Cl.
G06K 9/36 (2006.01)
G06K 9/00 (2006.01)

(52) U.S. Cl. .................................. 382/232; 382/154

(58) Field of Classification Search .............. 382/103, 382/107, 128, 154, 162, 166, 168, 214, 232, 382/233, 243, 250, 253, 305; 341/106, 107; 345/419, 424, 619, 653; 375/240.01, 240.22; 250/208.1
See application file for complete search history.

(56) References Cited

U.S. PATENT DOCUMENTS

| | | | | |
|---|---|---|---|---|
| 5,025,375 | A | | 6/1991 | Sugawara |
| 6,125,198 | A | * | 9/2000 | Onda .......................... 382/154 |
| 6,160,919 | A | * | 12/2000 | Hale ........................... 382/250 |
| 6,438,266 | B1 | * | 8/2002 | Bajaj et al. .................. 382/243 |
| 6,449,309 | B1 | * | 9/2002 | Tabata .................... 375/240.01 |
| 6,608,628 | B1 | * | 8/2003 | Ross et al. ................... 345/619 |
| 6,664,531 | B2 | * | 12/2003 | Gartner et al. ........... 250/208.1 |

OTHER PUBLICATIONS

XP010368820–Menegaz G et al: "Object coding of volumetric medical data" Image Processing, 1999. ICIP 99. Proceedings. 1999. International Conference on Kobe, Japan Oct. 24–28, 1999 Piscataway , NJ USA IEEE, US Oct. 24, 1999, pp. 920–924, XP010368820 ISBN: 0-7803-5467-2 p. 920–p. 921.

Benetiere M et al: "Scalable Compression of 3D Medical Datasets Using A (2D+T) Wavelet Video Coding Scheme" International Symposium on Signal Processing and its Applications. Proceedings, XX, XX Aug. 13, 2001, pp. 537–540, XP001061222.

Chee Y–K: "Survey of Progressive Image Transmission Methods" International Journal of Imaging Systems and Technology, Wiley and Sons, New York, US, vol. 10, No. 1, 1999, pp. 3–19, ISSN: 0899–9457.

* cited by examiner

*Primary Examiner*—Andrew W. Johns
*Assistant Examiner*—Amir Alavi
(74) *Attorney, Agent, or Firm*—Donald B. Paschburg; F. Chau Associates, LLC

(57) ABSTRACT

A system and method for data compression and visualization includes a system having a compression unit for compressing an input image of voxels in accordance with a weighted visualization importance, and a visualization unit in signal communication with the compression unit for visualizing the voxels in an order corresponding to the weighted visualization importance; and a corresponding method for defining a weighting function responsive to a visualization importance parameter for voxels, deriving an order of transmission for the voxels in correspondence with the weighting function, compressing the voxels with a look-up table indicative of the order of transmission, transmitting the compressed voxels in order of decreasing weighted visualization importance, and where the method is optionally for receiving the compressed voxels in order of decreasing weighted visualization importance, decompressing the voxels with the look-up table indicative of the order of transmission, and visualizing a voxel in the order in which it was received.

23 Claims, 3 Drawing Sheets

EFFICIENT ORDERING OF DATA FOR COMPRESSION AND VISUALIZATION

BACKGROUND

In appearance-based methods for object detection and recognition, images representative of the objects under consideration are typically transferred over limited bandwidth connections and stored on limited storage media. Typical sizes for computed tomography ("CT") image reconstruction are currently in the range of 512×512×512 voxels, and may reach sizes of 1024×1024×1024 voxels in the near future. Moving these kinds of datasets from one machine to another generally takes up a large fraction of the network bandwidth. Compression is usually proposed to alleviate this problem, as well as to reduce the disk space occupied by the dataset once it reaches the destination machine.

A typical method for viewing the dataset is to use volume rendering. Volume rendering uses a transfer function that maps from voxel values to color and opacity. The JPEG 2000 standard permits the ordering of bits in the compressed data stream to suit the goal.

SUMMARY

These and other drawbacks and disadvantages of the prior art are addressed by a system and method for data compression and visualization. The system includes a compression unit for compressing an input image of voxels in accordance with a weighted visualization importance, and a visualization unit in signal communication with the compression unit for visualizing the voxels in an order corresponding to the weighted visualization importance.

The corresponding method includes steps for defining a weighting function responsive to a visualization importance parameter for voxels, deriving an order of transmission for the voxels in correspondence with the weighting function, compressing the voxels with a look-up table indicative of the order of transmission, transmitting the compressed voxels in order of decreasing weighted visualization importance, and optionally includes steps for receiving the compressed voxels in order of decreasing weighted visualization importance, decompressing the voxels with the look-up table indicative of the order of transmission, and visualizing a voxel in the order in which it was received.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches an efficient approach to data compression and visualization for appearance-based object detection in accordance with the following exemplary figures, in which.

DETAILED DESCRIPTION OF PREFERRED EMBODIMENTS

In the appearance-based methods for object detection and recognition, images of the objects under consideration are transferred over limited bandwidth connections and stored on limited storage media. For prioritized data transfer, it is possible to initially transfer the bits that correspond to a low spatial resolution image, followed by the bits that correspond to the higher resolutions. Another ordering scheme is to transfer the higher order bits before the lower order bits. In an example, a machine A has the dataset, and a machine B is the destination. Viewing of the volume is desired on machine B.

When a compressed dataset is streamed in from machine A to machine B, a user should have the ability to view the volume during the transfer, and not wait for completion of data transfer, decompression of data and/or visualization of the volume. In addition, when the compressed dataset is stored on machine B, a user should have the ability to view the volume without waiting for decompression of the data and/or visualization of the volume. Accordingly, since the eventual goal is to visualize the volume, the compression is driven to facilitate visualization.

Figure 1:
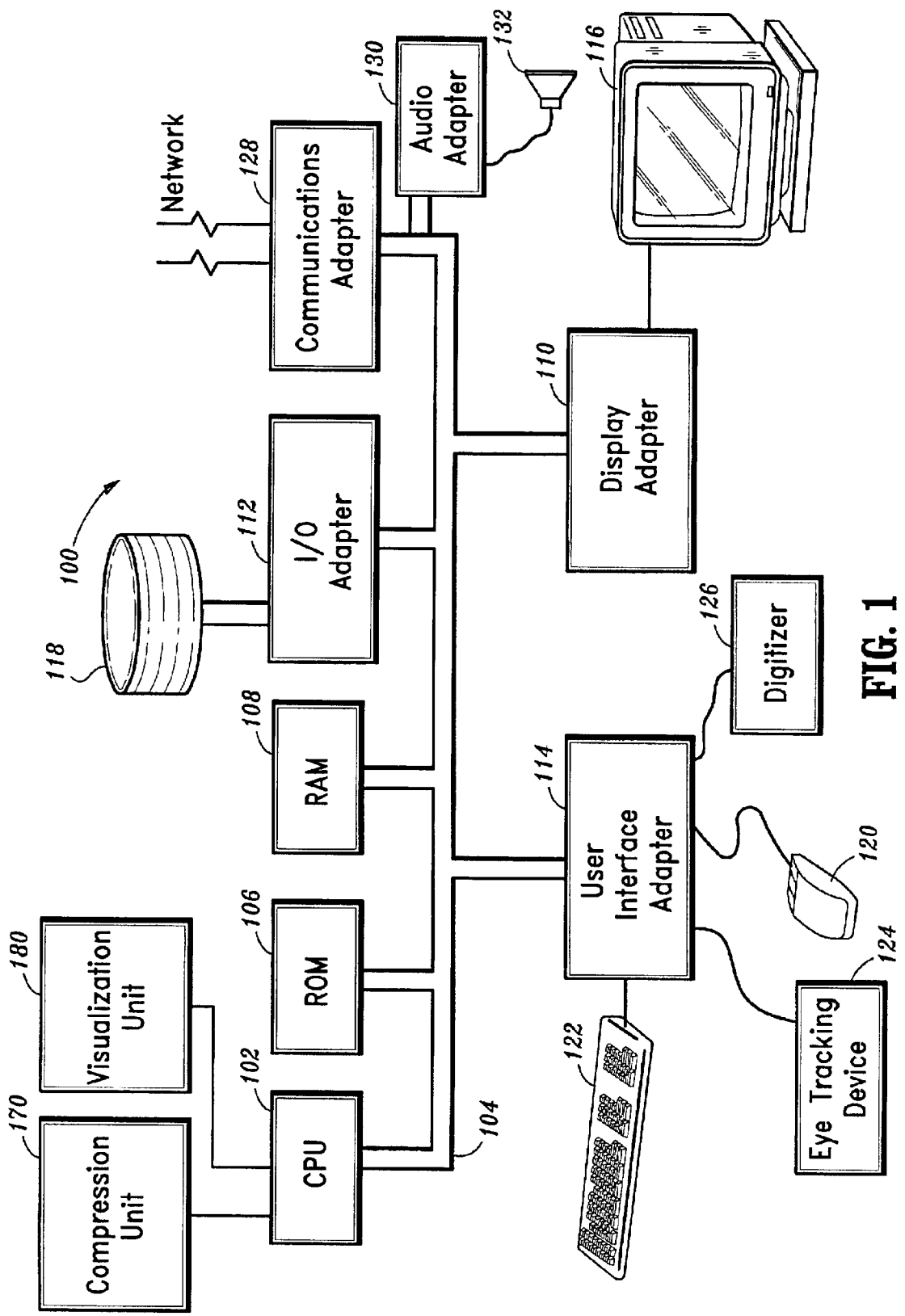
FIG. 1 shows a block diagram of a system for data compression and visualization according to an illustrative embodiment of the present disclosure.

FIG. 1 shows a block diagram of a system 100 for data compression and visualization according to an illustrative embodiment of the present disclosure. The system 100 includes at least one processor or central processing unit ("CPU") 102 in signal communication with a system bus 104. A read only memory ("ROM") 106, a random access memory ("RAM") 108, a display adapter 110, an I/O adapter 112, and a user interface adapter 114 are also in signal communication with the system bus 104.

A display unit 116 is in signal communication with the system bus 104 via the display adapter 110. A disk storage unit 118, such as, for example, a magnetic or optical disk storage unit, is in signal communication with the system bus 104 via the I/O adapter 112. A mouse 120, a keyboard 122, and an eye tracking device 124 are also in signal communication with the system bus 104 via the user interface adapter 114. The mouse 120, keyboard 122, and eye-tracking device 124 are used to aid in the generation of selected regions in a digital medical image.

A data compression unit 170 and a visualization unit 180 are also included in the system 100 and in signal communication with the CPU 102 and the system bus 104. While the data compression unit 170 and the visualization unit 180 are illustrated as coupled to the at least one processor or CPU 102, these components are preferably embodied in computer program code stored in at least one of the memories 106, 108 and 118, wherein the computer program code is executed by the CPU 102.

The system 100 may also include a digitizer 126 in signal communication with the system bus 104 via a user interface adapter 114 for digitizing an image. Alternatively, the digitizer 126 may be omitted, in which case a digital image may be input to the system 100 from a network via a communications adapter 128 in signal communication with the system bus 104, or via other suitable means as understood by those skilled in the art.

As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the data compression unit 170 and the visualization unit 180, as well as the other elements of the system 100, while practicing within the scope and spirit of the present disclosure.

In operation, if there exists a weighting scheme that describes those voxels that are more important for visualization than others are, then such a weighting scheme may be used to derive the order of transmission of the voxels. To achieve compliance with JPEG 2000, a look-up table that uniquely rearranges voxel values is used. For example, if the original voxel value has a low importance, then the mapped value would be close to 000000000000; and if the original voxel value has high importance, then the mapped value would be close to 111111111111. Therefore, in a transmission scheme that transmits the high order bits followed by the low order bits, the more important voxels would appear before the less important voxels in the compressed stream.

Figure 2:
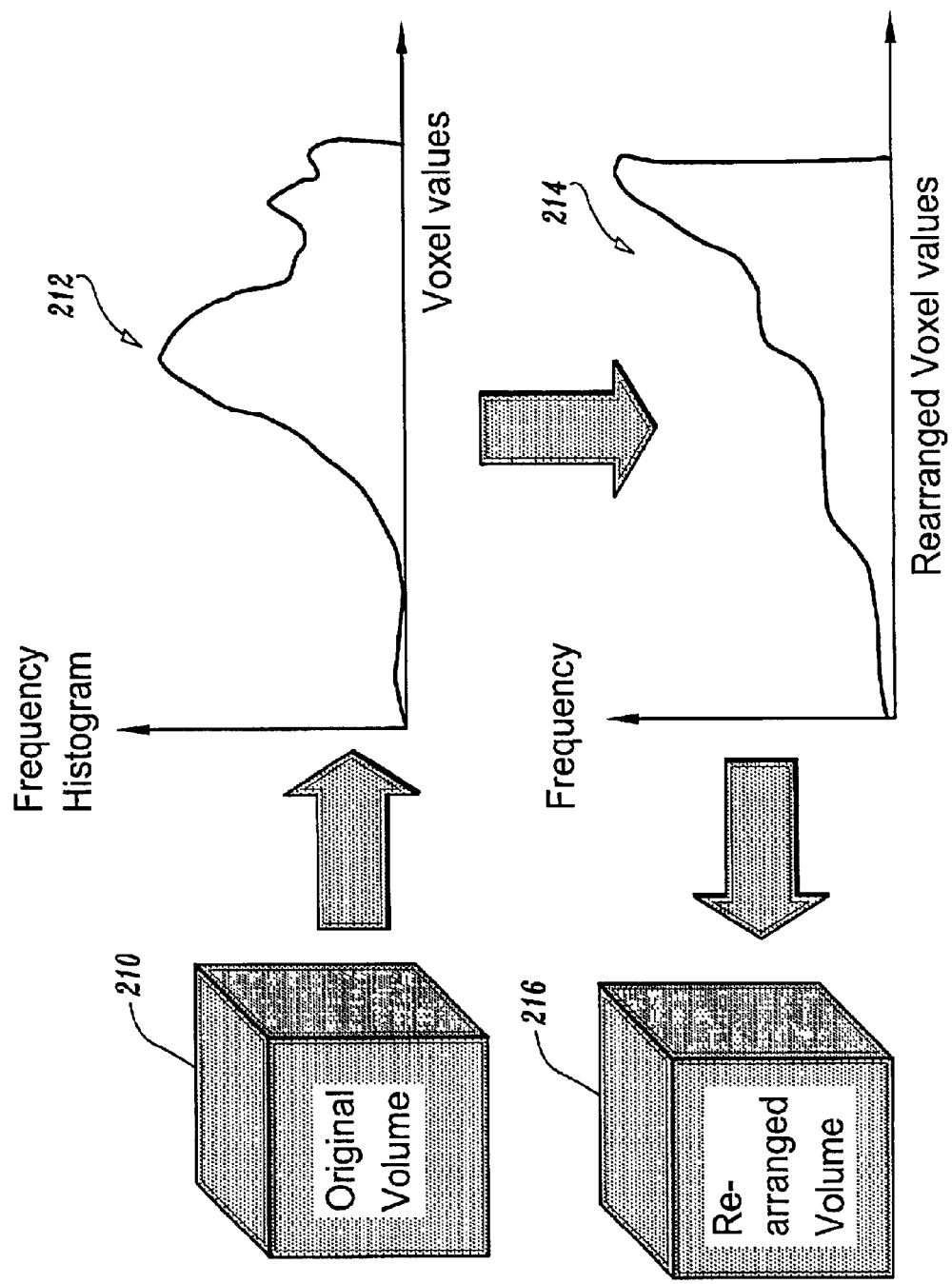
FIG. 2 shows a schematic progression diagram of a system for data compression and visualization according to an illustrative recurrence frequency method for the system of FIG. 1.

Turning to FIG. 2, one embodiment of a weighting scheme or importance function is the recurrence frequency histogram. Here, an original volume 210 is represented by voxels having the values indicated by the horizontal axis of a plot 212. The vertical axis of the plot 212 represents the recurrence frequency for each voxel value. In this embodiment, the voxel values are rearranged according to recurrence frequency, as indicated on the horizontal axis of a plot 214. The resulting rearranged volume 216 is then used for transmission and storage of higher weighted or more important information before lower weighted or less important information.

Figure 3:
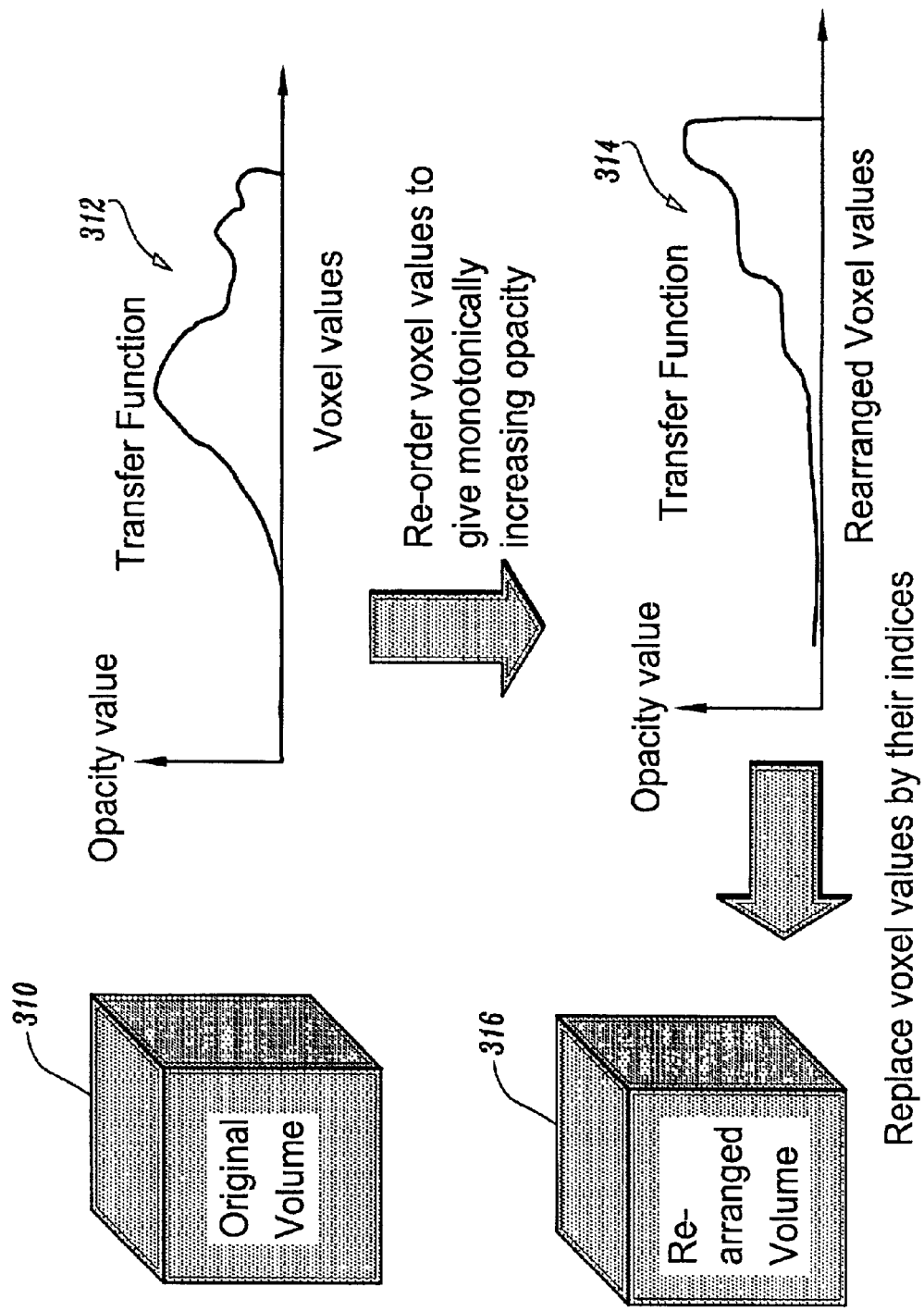
FIG. 3 shows a schematic progression diagram of a system for data compression and visualization according to an illustrative opacity value method for the system of FIG. 1.

Turning now to FIG. 3, another embodiment of an importance function is the visualization transfer function. If the transfer function causes a particular voxel to have a very low intensity or zero opacity, then that voxel is sent later in the compressed stream. For example, a scalar voxel value from the input volume to be visualized may be mapped using four look-up tables for red, green, blue, and opacity, respectively. Thus, an original volume 310 is represented by the opacity value versus voxel value transfer function 312. The voxel values are re-ordered according to monotonically increasing opacity value to achieve the opacity value versus rearranged voxel value transfer function 314. The resulting rearranged volume 316 is then used for transmission and storage of higher weighted or more important information before lower weighted or less important information.

Other embodiments of the importance function are also possible, such as, for example, the use of both the frequency histogram and the transfer function, which may be achieved, for example, by using the product of the two functions. Thus, the high frequency (i.e., common) and high opacity voxels would be sent first, and the low frequency and low opacity voxel values would be sent last.

The disclosed technique can be applied to many appearance-based image transmission and storage problems in addition to medical images. Alternate examples include automatic object detection on assembly lines by machine vision, human face detection in security control, and the like. As shall be recognized by those of ordinary skill in the pertinent art, the term "image" as used herein may also represent three-dimensional, four-dimensional, and higher dimensional datasets in alternate embodiments.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for data compression and visualization, the method comprising:

defining a weighting function responsive to a visualization importance parameter for a plurality of voxels;

deriving an order of transmission for the plurality of voxels in correspondence with the weighting function;

compressing the plurality of voxels with a look-up table indicative of the order of transmission; and transmitting the compressed plurality of voxels in order of decreasing weighted visualization importance.

2. A method as defined in claim 1, further comprising:

receiving the compressed plurality of voxels in order of decreasing weighted visualization importance;

decompressing the plurality of voxels with the look-up table indicative of the order of transmission; and visualizing at least one of the plurality of voxels in the order in which it was received.

3. A method as defined in claim 1 wherein the plurality of voxels corresponds to a medical image.

4. A method as defined in claim 1 wherein the weighting function corresponds to a recurrence frequency histogram.

5. A method as defined in claim 1 wherein the weighting function corresponds to an opacity value transfer function.

6. A method as defined in claim 1 wherein the weighting function corresponds to an intensity value transfer function.

7. A system (100) for data compression and visualization, the system comprising:
- a compression unit (170) for compressing an input image comprising a plurality of voxels in accordance with a weighted visualization importance; and
- a visualization unit (180) in signal communication with the compression unit for visualizing at least one of the plurality of voxels in the order corresponding to its weighted visualization importance.

8. A system (100) as defined in claim 7 wherein the input image comprises a medical image.

9. A system (100) as defined in claim 7, further comprising:
- a CPU (102) in signal communication with said visualization unit (180) for processing the input image.

10. A system (100) as defined in claim 9, further comprising:
- a display adapter (110) in signal communication with the CPU (102) for displaying the input image; and
- an I/O adapter (112) in signal communication with the CPU (102) for recalling the locations of the voxels visualized from the input image to provide an indication of the location of a visualized object within the input image.

11. A system (100) as defined in claim 9, further comprising:
- a user interface adapter (114) in signal communication with the CPU (102) for at least receiving a selection decision for at least one image from a user.

12. A system for data compression and visualization, the system comprising:
- defining means for defining a weighting function responsive to a visualization importance parameter for a plurality of voxels;
- deriving means for deriving an order of transmission for the plurality of voxels in correspondence with the weighting function;
- compressing means for compressing the plurality of voxels with a look-up table indicative of the order of transmission; and
- transmitting means for transmitting the compressed plurality of voxels in order of decreasing weighted visualization importance.

13. A system as defined in claim 12, further comprising:
- receiving means for receiving the compressed plurality of voxels in order of decreasing weighted visualization importance;
- decompressing means for decompressing the plurality of voxels with the look-up table indicative of the order of transmission; and
- visualizing means for visualizing at least one of the plurality of voxels in the order in which it was received.

14. A system as defined in claim 12 wherein the plurality of voxels corresponds to a medical image.

15. A system as defined in claim 12 wherein the defining means for defining a weighting function is responsive to a recurrence frequency histogram.

16. A system as defined in claim 12 wherein the defining means for defining a weighting function is responsive to an opacity value transfer function.

17. A system as defined in claim 12 wherein the defining means for defining a weighting function is responsive to an intensity value transfer function.

18. A program storage device readable by machine, tangibly embodying a program of instructions executable by the machine to perform method steps for data compression and visualization, the method steps comprising:
- defining a weighting function responsive to a visualization importance parameter for a plurality of voxels;
- deriving an order of transmission for the plurality of voxels in correspondence with the weighting function;
- compressing the plurality of voxels with a look-up table indicative of the order of transmission; and
- transmitting the compressed plurality of voxels in order of decreasing weighted visualization importance.

19. A program storage device as defined in claim 18, the method steps further comprising:
- receiving the compressed plurality of voxels in order of decreasing weighted visualization importance;
- decompressing the plurality of voxels with the look-up table indicative of the order of transmission; and
- visualizing at least one of the plurality of voxels in the order in which it was received.

20. A program storage device as defined in claim 18 wherein the plurality of voxels corresponds to a medical image.

21. A program storage device as defined in claim 18 wherein the method step for defining a weighting function comprises defining a recurrence frequency histogram.

22. A program storage device as defined in claim 18 wherein the method step for defining a weighting function comprises defining an opacity value transfer function.

23. A program storage device as defined in claim 18 wherein the method step for defining a weighting function comprises defining an intensity value transfer function.

* * * * *